C. H. BAILEY.
FLOWERPOT.
APPLICATION FILED JAN. 29, 1919.

1,426,808.

Patented Aug. 22, 1922.

Inventor:
C. H. Bailey
By
Attorney

UNITED STATES PATENT OFFICE.

CHARLES H. BAILEY, OF CLEVELAND, OHIO.

FLOWERPOT.

1,426,808.    Specification of Letters Patent.    Patented Aug. 22, 1922.

Application filed January 29, 1919. Serial No. 273,779.

*To all whom it may concern:*

Be it known that I, CHARLES H. BAILEY, a citizen of the United States, residing at Cleveland, in the county of Cuyahoga, and State of Ohio, have invented certain new and useful Improvements in Flowerpots; and I do hereby declare the following to be a full, clear, and exact description of the invention, such as will enable others skilled in the art to which it appertains to make and use the same.

This invention relates to flower pots and the like and the primary object of the invention is to provide an improved flower pot or transplanting receptacle, in which tender plants may be raised from the seed therein and when the same have reached the desired height the flower pot or receptacle may be placed directly in the ground containing the plants and thus eliminate the necessity of removing the plants from the earth or hot house bed into the open ground, which retards the growth of the plants and injures the roots thereof.

Another object of the invention is to provide a transplanting device, which can be buried in the ground containing the plants, and which is so constructed, that the roots of the plants will be allowed to sprout through the receptacle and into the open ground, the receptacle being also made of such material that the same will gradually rot or decay.

A further object of the invention is to provide a flower pot or transplanting receptacle in which the seeds or the tender plants can be planted directly therein and when the plants have reached a certain height and the weather permits, the plants and receptacle can be buried in the open ground in any desired place without retarding the growth of the plants.

With these and other objects in view, the invention consists in the novel construction, arrangement and formation of parts, as will be hereinafter more specifically described, claimed and illustrated in the accompanying drawings forming a part thereof, in which:

Figure 1:
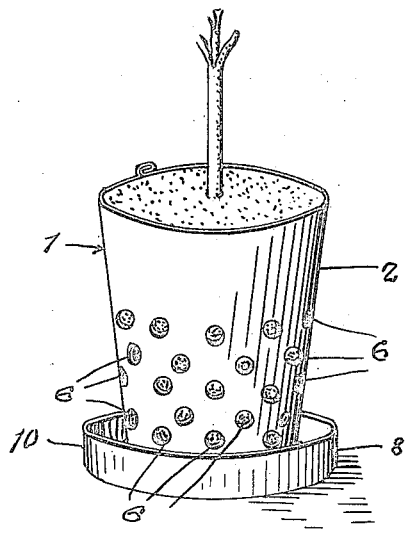
Figure 1 is a perspective view of the improved pot and saucer therefor.
Figure 2:
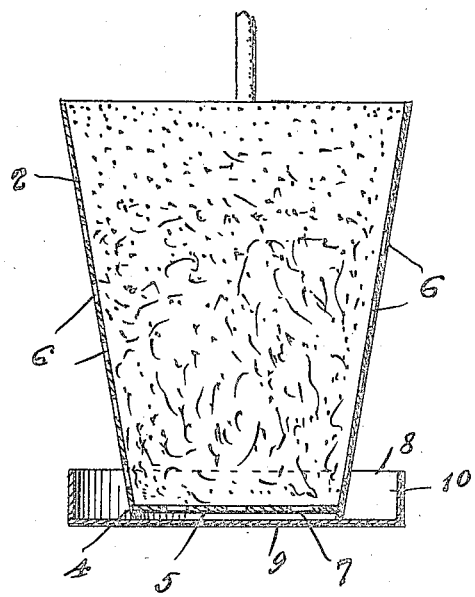
Figure 2 is a vertical section through the same.
Figure 3:
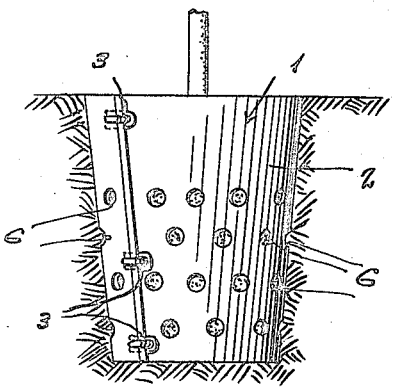
Figure 3 is a view of the flower pot or transplanting receptacle buried in the ground.

Referring to the drawings in detail, wherein similar reference characters designate corresponding parts throughout the several views, the numeral 1 generally indicates the improved pot or transplanting receptacle, which is composed of a side wall or enclosing body 2 which is gradually tapered from the upper edge thereof towards the lower edge which permit of the receptacles to be nested into one another for shipping or like purposes. The body 2 is preferably constructed from a single sheet of material rolled to form the receptacle and the terminals or edges of the body are connected together by metallic clips 3. If so desired glue or the like may be used to join the body together. The inner surface of the wall or body 2 adjacent the lower edge thereof is provided with an internal groove 4, in which is fitted a circular bottom wall or disk 5. The side wall or body 2 is provided with a plurality of spaced annular rows of perforations 6, which permit the roots of the plants to protrude through the same, when the receptacle is buried in the ground with the plants. The upper portion of the body is left imperforate, as it is unnecessary to perforate the upper portion of the body, as the roots of the plants will be near the bottom of the receptacle. The bottom or disk 5 is also provided with a plurality of apertures 7 which permit the roots of the plants to protrude through and also permit the drainage of water in the receptacle.

A saucer 8 is provided, which is formed of waxed or other suitable waterproof paper and is of larger size than the bottom wall of the receptacle 1. This saucer is preferably made of a stronger and better grade of material than the flower pot, so that the same will not deteriorate or become weakened in use. The saucer 8 is preferably stamped from a single sheet of material and consists of the bottom wall 9 and the upwardly extending annular flange 10.

In use of the improved device, three or four seeds may be planted in the earth in the container or flower pot and each of the containers is placed upon one of the saucers 8, which effectively catches the water drained from the receptacle. These receptacles are kept in the house in a suitable sunny place until the plants have reached the desired height and when the weather permits the pot is lifted out of the saucer and buried in the ground in any desired location. It is to be understood that only the strongest plant is left in the receptacle and the weaker or smaller plants are pulled up. As the plant grows, the roots gradually extend through the openings 6 and 7 and into the ground. The container itself, which is preferably formed of light perishable material, gradually decays and rots away.

From the foregoing it can be seen that an improved transplanting receptacle is provided, which permits the plants to be readily handled and planted, without retarding the growth of the plan or destroying the same.

These receptacles can be used with equal advantage by hot house owners or florists as the seed can be placed in the receptacles and then shipped or sold directly in the same to the consumers. The pots form ready means for handling the plants and eliminates the usual inconveniences associated therewith, such as the loss of the soil from around the roots and the spilling of the same over the floor.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when required without sacrificing any of the advantages of my invention as set forth.

What I claim as new is:

1. A planting pot having an upstanding soil enclosing wall of material disintegrable on transfer to the ground, a bottom, said wall having means to retain said bottom, and said means being disintegrable before the remainder of said wall.

2. A planting pot having its upstanding soil enclosing wall of material disintegrable on transfer to the ground, said wall having a groove in its inner surface to provide a weakened portion for disintegration before the remainder thereof, and a bottom disposed in said groove.

In testimony whereof I affix my signature in presence of two witnesses.

CHARLES H. BAILEY.

Witnesses:
 THOS. P. ARMSTRONG,
 THOMAS B. CODEK.